(12) United States Patent
Barna

(10) Patent No.: US 7,186,964 B2
(45) Date of Patent: Mar. 6, 2007

(54) DARK CURRENT REDUCTION CIRCUITRY FOR CMOS ACTIVE PIXEL SENSORS

(75) Inventor: Sandor L. Barna, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/327,359

(22) Filed: Jan. 9, 2006

(65) Prior Publication Data

US 2006/0113461 A1 Jun. 1, 2006

Related U.S. Application Data

(62) Division of application No. 10/225,185, filed on Aug. 22, 2002, now Pat. No. 7,015,448.

(51) Int. Cl.
*H01J 40/14* (2006.01)
(52) U.S. Cl. .................................. 250/208.1; 348/308
(58) Field of Classification Search ................ 250/208, 250/208.1, 214 R; 257/229, 292; 348/308
See application file for complete search history.

(56) References Cited

U.S. PATENT DOCUMENTS

| 5,578,813 | A | | 11/1996 | Allen |
| 5,952,686 | A | | 9/1999 | Chou |
| 6,016,281 | A | | 1/2000 | Brox |
| 6,054,704 | A | * | 4/2000 | Pritchard .................. 250/208.1 |
| 6,809,768 | B1 | | 10/2004 | Merrill |

* cited by examiner

*Primary Examiner*—Thanh X. Luu
*Assistant Examiner*—Tony Ko
(74) *Attorney, Agent, or Firm*—Dickstein Shapiro LLP

(57) ABSTRACT

A row driver circuit is disclosed for supplying a reset voltage to a plurality of reset transistors of an active pixel sensor array while minimizing gate induced drain leakage (GIDL). The row driver circuit is configured to supply a high voltage level (e.g., Vdd or higher) to the reset transistors of the array during a reset operation. The row driver circuit is further configured to supply a low voltage level (e.g., a voltage level higher than ground) to the reset transistors of the array when the pixels are not being reset (e.g., during integration). The reduced potential difference realized between the respective gates of the reset transistors and the respective photodiodes of the pixels, when the pixels are not being reset, results in reduced GIDL.

21 Claims, 6 Drawing Sheets

DARK CURRENT REDUCTION CIRCUITRY FOR CMOS ACTIVE PIXEL SENSORS

CROSS REFERENCE TO RELATED APPLICATIONS

The present application is a divisional of U.S. application Ser. No. 10/225,185, filed Aug. 22, 2002 now U.S. Pat. No. 7,015,448, the disclosure of which is herewith incorporated by reference in its entirety.

FIELD OF THE INVENTION

The present invention relates generally to complementary metal oxide semiconductor (CMOS) active pixel sensors, and more particularly to the reduction of dark current in CMOS active pixel sensors.

BACKGROUND OF THE INVENTION

Image sensor circuits are used in a variety of different types of digital image capture systems, including products such as scanners, copiers, and digital cameras. The image sensor is typically composed of an array of light-sensitive pixels that are electrically responsive to incident light reflected from an object or scene whose image is to be captured.

The performance of an image capture system depends in large part on the sensitivity of each individual pixel in the sensor array and its immunity from noise. Pixel sensitivity is defined here as being related to the ratio of a change in the pixel output voltage to the photogenerated charge in the pixel. Noise here is defined as small fluctuations in a signal that can be caused by a variety of known sources. An image sensor with increased noise immunity yields sharper, more accurate images in the presence of environmental and other noise.

Improving the sensitivity of each pixel permits a reduction in exposure time which in turn allows the capture of images at a greater rate. This allows the image capture system to capture motion in the scene. In addition to allowing greater frame rate, higher pixel sensitivity also helps detect weaker incident light to capture acceptable quality images under low light conditions.

One way to increase pixel sensitivity is to increase the efficiency of the photodiode by changing the photodiode's responsiveness characteristics. Doing so, however, particularly for a CMOS imager pixel, can require deviating from a standard MOS integrated circuit fabrication process, thereby further increasing the cost of manufacturing the image sensor circuit.

With reference to FIG. 1, which depicts a schematic diagram of a portion of a conventional pixel sensor array 120, a photo-sensitive diode 106 within a pixel 100 is first reset by asserting the RST signal which activates reset transistor 104. Activating reset transistor 104 places a reset voltage (e.g., Vdd) across the photodiode. Then, the photodiode 106 is exposed to incident light which causes the charge stored on the photodiode 106 to dissipate the reset voltage initially across the photodiode 106 in proportion to the intensity of the incident light. After a predetermined time period during which the photodiode 106 is exposed to the incident light and the reset voltage is allowed to dissipate from the photodiode 106 (i.e., the "integration" time), the amount of charge stored on the photodiode 106 is transferred to a sample and hold circuit, via source-follower transistor 108 by asserting the SEL signal at the gate of select transistor 110. The sample and hold circuit is conventionally located at one end of the column line 102 and successively reads out image signal values from each pixel coupled to the column line 102.

After the charge on the photodiode 106 has been read-out, the photodiode 106 is reset by asserting the RST signal at the gate of the reset transistor 104 and the reset potential (e.g., Vdd) which is distributed across the photodiode 106 is read-out onto the column line 102 where it too is sampled by the sample and hold circuit. The amount of incident fight which is detected by the photodiode 106 is computed by subtracting the pixel image signal voltage from the reset voltage.

FIG. 2 depicts a schematic diagram of a conventional row driver circuit 200. The row driver circuit 200 generates the RST signal applied to the gate of reset transistor 104 (of FIG. 1). Transistors 202 and 204 are configured as an inverter with reset bar as the input and the RST signal as the output. As depicted, the RST signal is set at either Vdd or ground, depending upon the logic state of the reset signal. For example, if the reset signal is logic HIGH (e.g., "1"), then reset bar is logic LOW (e.g., "0"). As a result, transistor 202 is active and transistor 204 is inactive and the RST signal is at Vdd. It follows that when the reset signal is logic LOW, transistor 202 is inactive and transistor 204 is active with the RST signal set at ground.

Turning to FIG. 3, a schematic diagram of an alternate conventional row driver circuit 300 for generating the RST signal is depicted. Row driver circuit 300 is used to generate a pumped RST signal to the gate of the reset transistor 104. That is, row driver circuit produces a RST signal at a voltage level higher than Vdd, namely, Vrst_high. For example, when the reset signal is logic HIGH, the RST signal is set at Vrst_high, and when the reset signal is logic LOW, the RST signal is set to ground. Row driver circuit 300 is made up of cross-coupled transistors 302, 304, 306 and 308. The RST signal is generated on signal path 310.

One problem commonly encountered with the pixel reset process is that of leakage current flowing from the reset voltage source (e.g., Vdd of FIG. 1) through the reset transistor 104 and to the photodiode 106 when the reset transistor 104 is not activated (e.g., the RST signal is set to ground). Such leakage current may flow into the photodiode 106 during the integration period and alter the pixel image signal. The introduction of such leakage current, known as gate induced drain leakage (GIDL), and which is a prominent component of pixel noise known as "dark current," inherently and negatively effects the imaging process. As mentioned above, it is generally desirable to minimize pixel noise, and thus, it is desirable to develop a pixel configuration with reduced GIDL.

BRIEF SUMMARY OF THE INVENTION

The present invention provides a row driver circuit for supplying reset voltage levels to a plurality of reset transistors of an active pixel sensor array while minimizing gate induced drain leakage (GIDL). The row driver circuit is configured to supply a high voltage level (e.g., Vdd or higher) to the reset transistors of the array during a reset operation. The row driver circuit is further configured to supply a low voltage level that is lower than the high voltage level but higher than a ground level voltage, to the reset transistors of the array when the pixels are not being reset (e.g., during integration). The reduced potential difference between the respective gates of the reset transistors and the respective photodiodes of the pixels, when the pixels are not being reset, results in reduced GIDL.

BRIEF DESCRIPTION OF THE DRAWINGS

The above and other features and advantages of the invention will be more readily understood from the following detailed description of the invention which is provided in connection with the accompanying drawings.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those of ordinary skill in the art to make and use the invention, and it is to be understood that structural, logical or procedural changes may be made to the specific embodiments disclosed without departing from the spirit and scope of the present invention.

Figure 1:
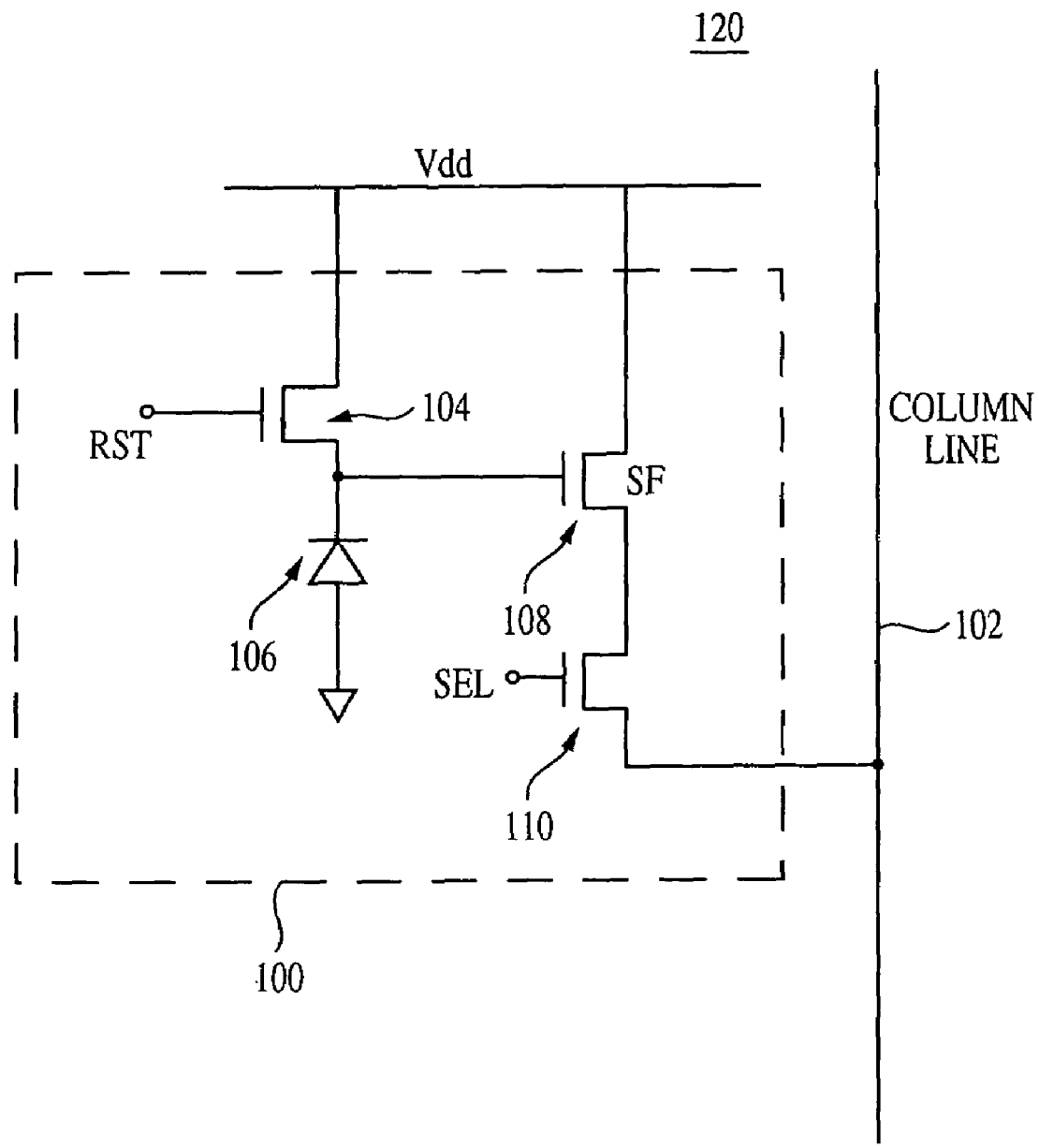
FIG. 1 depicts a schematic diagram of a portion of a conventional pixel sensor array.
Figure 2:
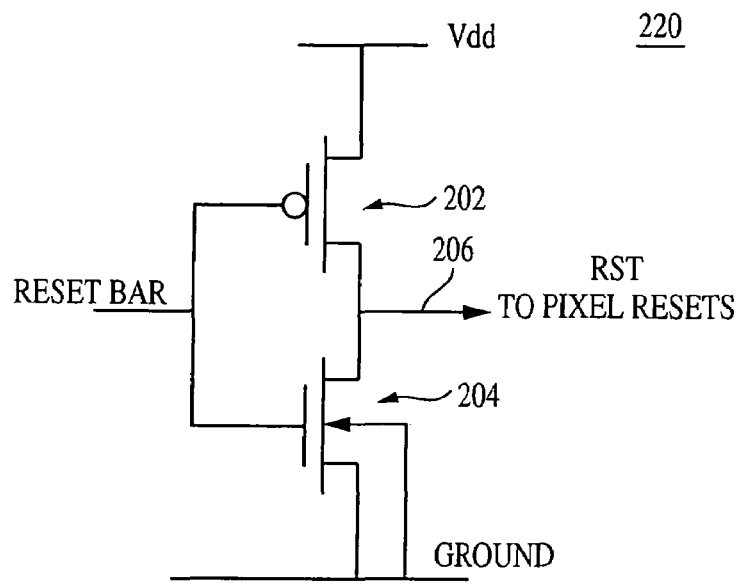
FIG. 2 depicts a schematic diagram of a conventional row driver circuit.
Figure 4:
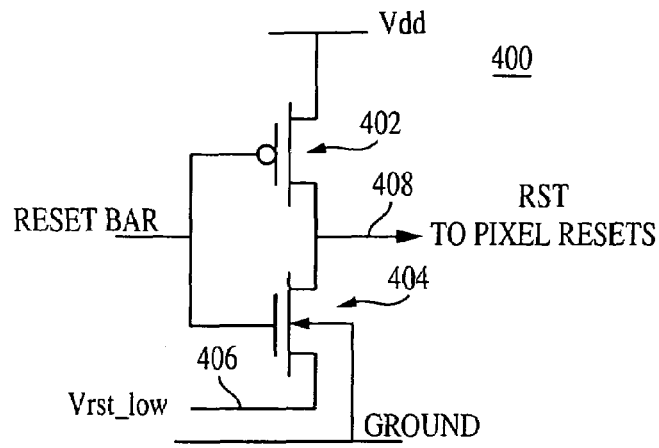
FIG. 4 depicts a schematic diagram of a row driver circuit, in accordance with an exemplary embodiment of the invention.

FIG. 4 depicts a schematic diagram of a row driver circuit 400, in accordance with an exemplary embodiment of the invention. The row driver circuit 400 generates the RST signal applied to the gate of a reset transistor (e.g., 104 of FIG. 1). Similarly to the row driver circuit 200 of FIG. 2, the row driver circuit 400 has two transistors 402, 404 configured as an inverter. The operation of row driver circuit 400 is identical to that of row driver circuit 200, except that the RST signal is set at either Vdd or Vrst_low, depending upon the logic state of the reset signal. For example, if the reset signal is logic HIGH (e.g., "1"), then the reset bar signal is logic LOW (e.g., "0"). As a result, transistor 402 is active and transistor 404 is inactive and the RST signal is at Vdd. It follows that when the reset signal is logic LOW, transistor 402 is inactive and transistor 404 is active with the RST signal set at Vrst_low. Setting the low state of the RST signal applied to the gate of the reset transistor 104 to a voltage level higher than ground effectively reduces the potential difference between the gate of the reset transistor 104 and the reset photodiode 106, and as a result, reduces the GIDL.

Figure 3:
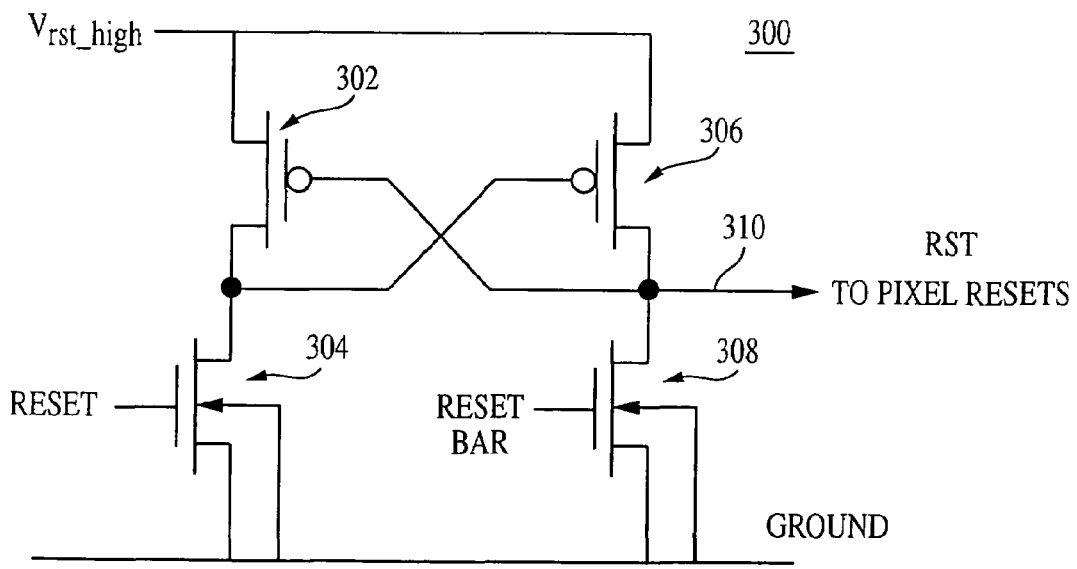
FIG. 3 depicts a schematic diagram of another conventional row driver circuit.
Figure 5:
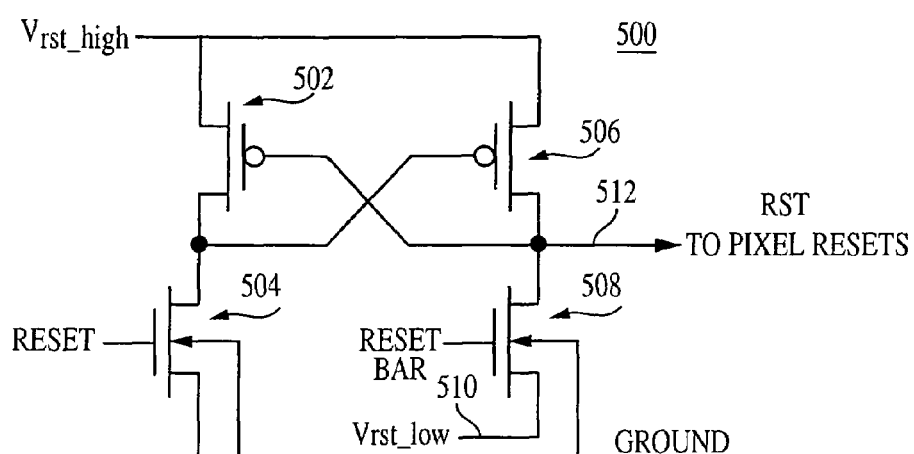
FIG. 5 depicts a schematic diagram of a row driver circuit, in accordance with another exemplary embodiment of the invention.

Turning to FIG. 5, a schematic diagram of a row driver circuit 500 is depicted in accordance with another exemplary embodiment of the invention. Row driver circuit 500 contains cross-coupled transistors 502, 504, 506 and 508. The operation of row driver circuit 500 is identical to that of row driver circuit 300 (of FIG. 3) except that when the reset signal is set to logic LOW, the RST signal at signal path 512 is set to Vrst_low rather than to ground. This is evident since the lower source/drain terminal of transistor 508 is coupled to conductor 510, set at Vrst_low, rather than to ground. As described above in connection with FIG. 4, setting the low voltage level of the RST signal to a voltage level higher than ground reduces GIDL within the pixel.

Figure 6:
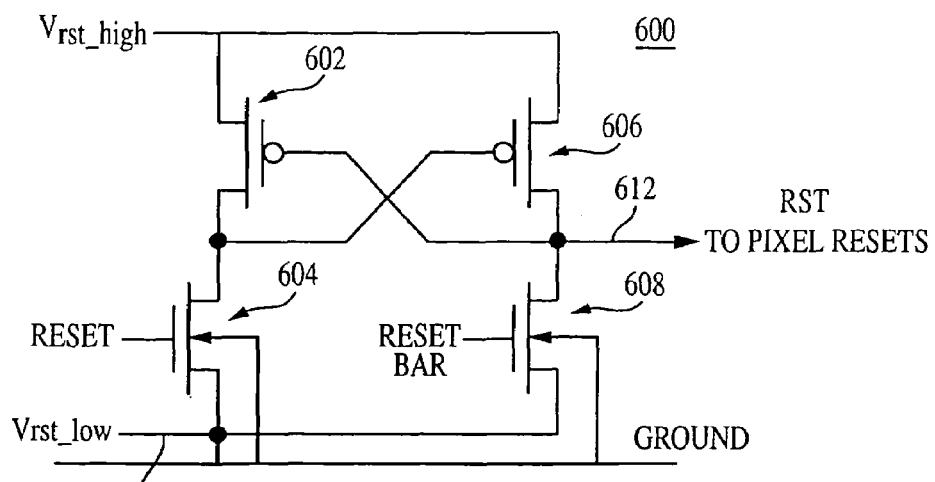
FIG. 6 depicts a schematic diagram of a row driver circuit, in accordance with another exemplary embodiment of the invention.

FIG. 6 depicts a schematic diagram of a row driver circuit 600, in accordance with another exemplary embodiment of the invention. The structure and operation of row driver circuit 600 is essentially identical to that of row driver circuit 500 (of FIG. 5), except that a source/drain terminal of transistor 604 and a source drain terminal of transistor 608 are both coupled to the same Vrst_low voltage terminal. As a result, not only is the RST signal at signal path 612 set to Vrst_low, but this embodiment also offers manufacturing advantages due to the symmetrical circuit layout (i.e., as compared with the circuit of FIG. 5).

Figure 7:
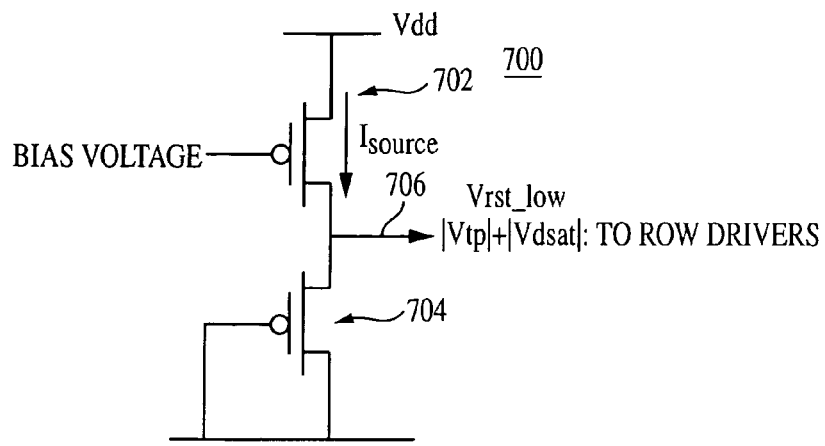
FIG. 7 depicts a schematic diagram of a low reset voltage generator, in accordance with an exemplary embodiment of the invention.

Turning now to FIG. 7, a schematic diagram of a low reset voltage, Vrst_low, generator 700 is depicted, in accordance with an exemplary embodiment of the invention. A first source/drain terminal of transistor 702 is coupled to a power supply voltage terminal (e.g., Vdd) and a second source/drain terminal of transistor 702 is coupled to a first source/drain terminal of transistor 704. A second source/drain terminal of transistor 704, as well as the gate of transistor 704, are coupled to ground, thus forming a diode. The gate of transistor 702 is coupled to a bias voltage source which activates the transistor 702. In operation, a current source flows through transistor 702 to ground. As a result, the voltage seen at signal path 706 (i.e., Vrst_low) is approximately |Vt|+|Vdsat| (e.g., approximately 1V), where |Vt| is the absolute value of the threshold voltage of the diode connected transistor 704 and |Vdsat| is the absolute value of the saturation voltage from the drain to the source of the transistors.

Figure 8:
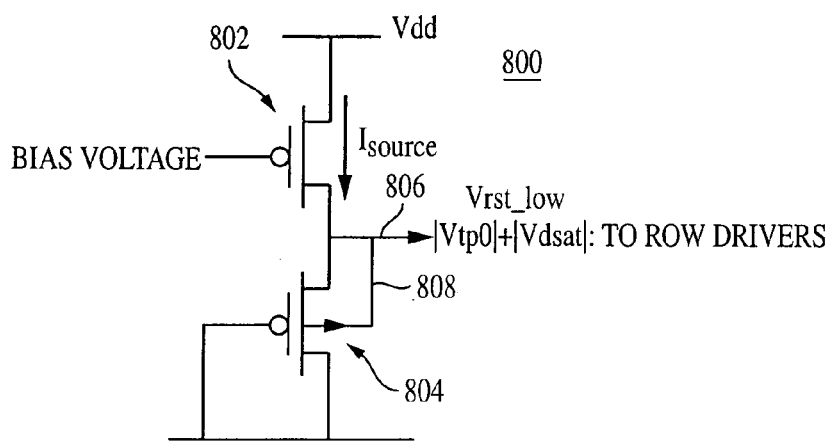
FIG. 8 depicts a schematic diagram of a low reset voltage generator, in accordance with another exemplary embodiment of the invention.

FIG. 8 depicts a schematic diagram of a low reset voltage generator 800, in accordance with another exemplary embodiment of the invention. The FIG. 8 generator 800 is identical to the generator 700 of FIG. 7, except that the n-well of p-type transistor 804 is coupled to the output signal path 806 via conductor 808. This sets the bulk-to-source voltage (Vbs) to 0V, thereby reducing the magnitude of the threshold voltage |Vt| to |Vt$_0$|. As a result, the voltage level of Vrst_low on signal path 806 is set at approximately |Vt$_0$|+|Vdsat| (e.g., approximately 0.8V).

Figure 9:
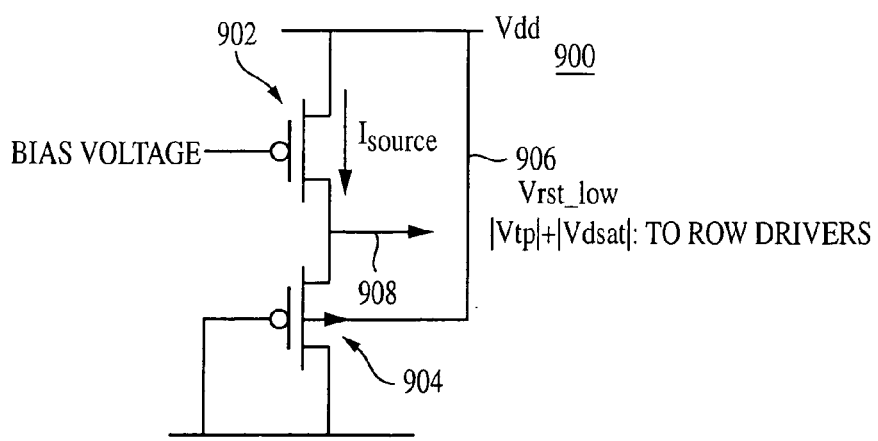
FIG. 9 depicts a schematic diagram of a low reset voltage generator, in accordance with another exemplary embodiment of the invention.

FIG. 9 depicts a schematic diagram of a low reset voltage generator 900, in accordance with another exemplary embodiment of the invention. The FIG. 9 generator is identical to the generator 700 of FIG. 7, except that the n-well of p-type transistor 904 is coupled to the voltage source terminal (e.g., Vdd) via conductor 906. As a result, the voltage level of Vrst_low on signal path 908 is set at approximately |Vt|+Vdsat (e.g., approximately 1V). Now, |Vbs| is greater than 0V and |Vt| rises above |Vt$_0$|.

Any one of the respective low reset voltage generators depicted in FIGS. 7–9, or any other equivalent circuits known to those of ordinary skill in the art, may be used to generate the low reset voltage (i.e., Vrst_low) that is depicted in the row driver circuits of FIGS. 4–6.

Figure 10:
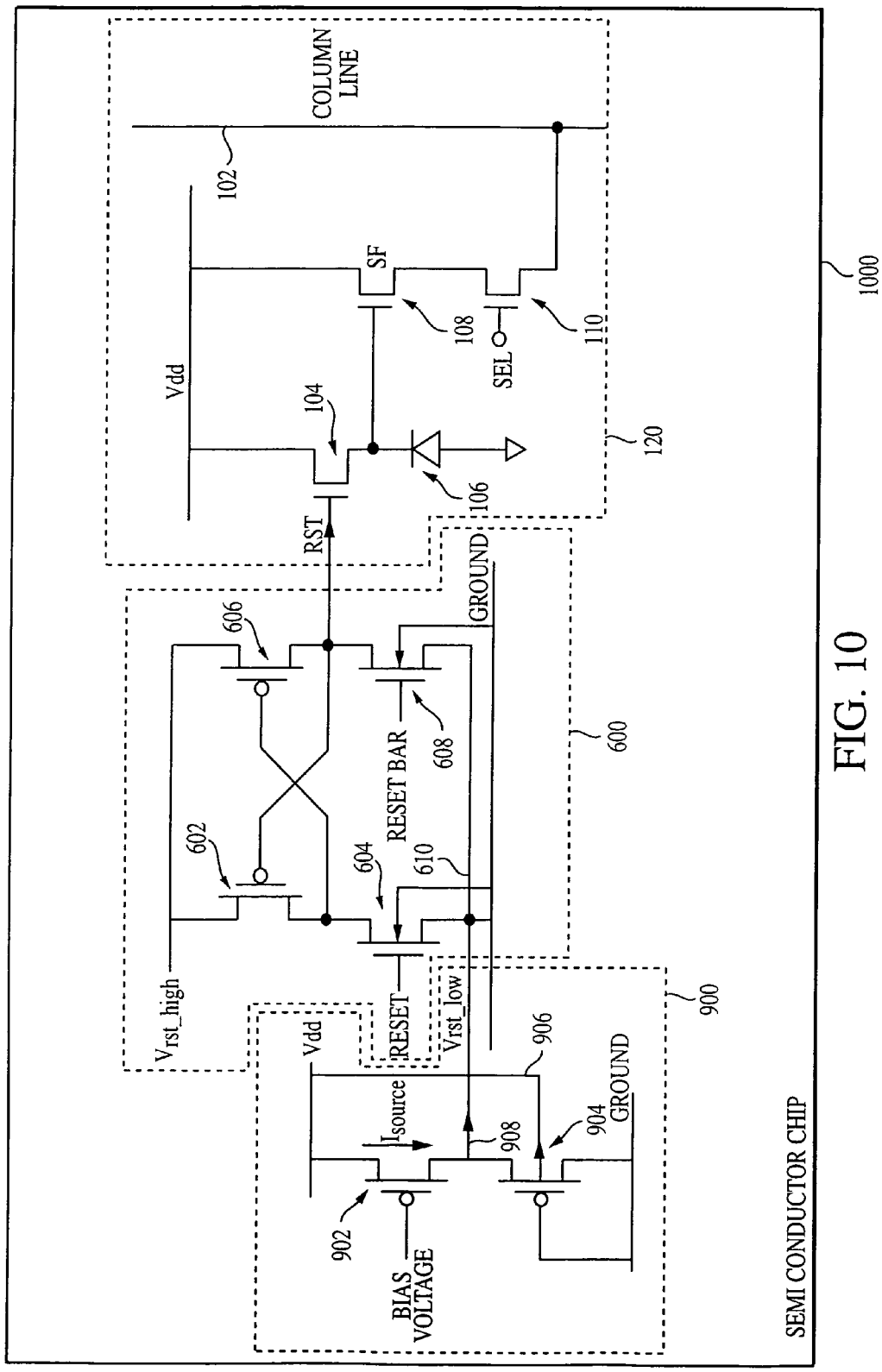
FIG. 10 depicts a semiconductor chip containing a portion of an active pixel sensor, in accordance with an exemplary embodiment of the invention.

Turning to FIG. 10, a semiconductor chip 1000 containing a portion of an active pixel sensor is depicted, in accordance with an exemplary embodiment of the invention. The chip 1000 may be made of any material suitable for use with active pixel sensors, including silicon-based materials, glass-based materials, etc. For exemplary purposes, the semiconductor chip 1000 is split into three separate sections. The first section is a portion of a pixel sensor array 120, such as the portion of the pixel sensor array described in connection with FIG. 1.

The second section of FIG. 10 is the row driver circuit 600, as described in connection with FIG. 6. Row driver circuit 600 generates the RST signal and delivers it to the gate of reset transistor 104. The third section of FIG. 10 is the low reset voltage generator 900 described in connection with FIG. 9. The low reset voltage generator 900 generates Vrst_low and forwards the same to source/drain terminals of transistors 604 and 608 of the row driver circuit 600. The operation of the separate sections of the active pixel sensor of FIG. 10 is already described in connection with FIGS. 1, 6 and 9 and need not be repeated here.

Figure 11:
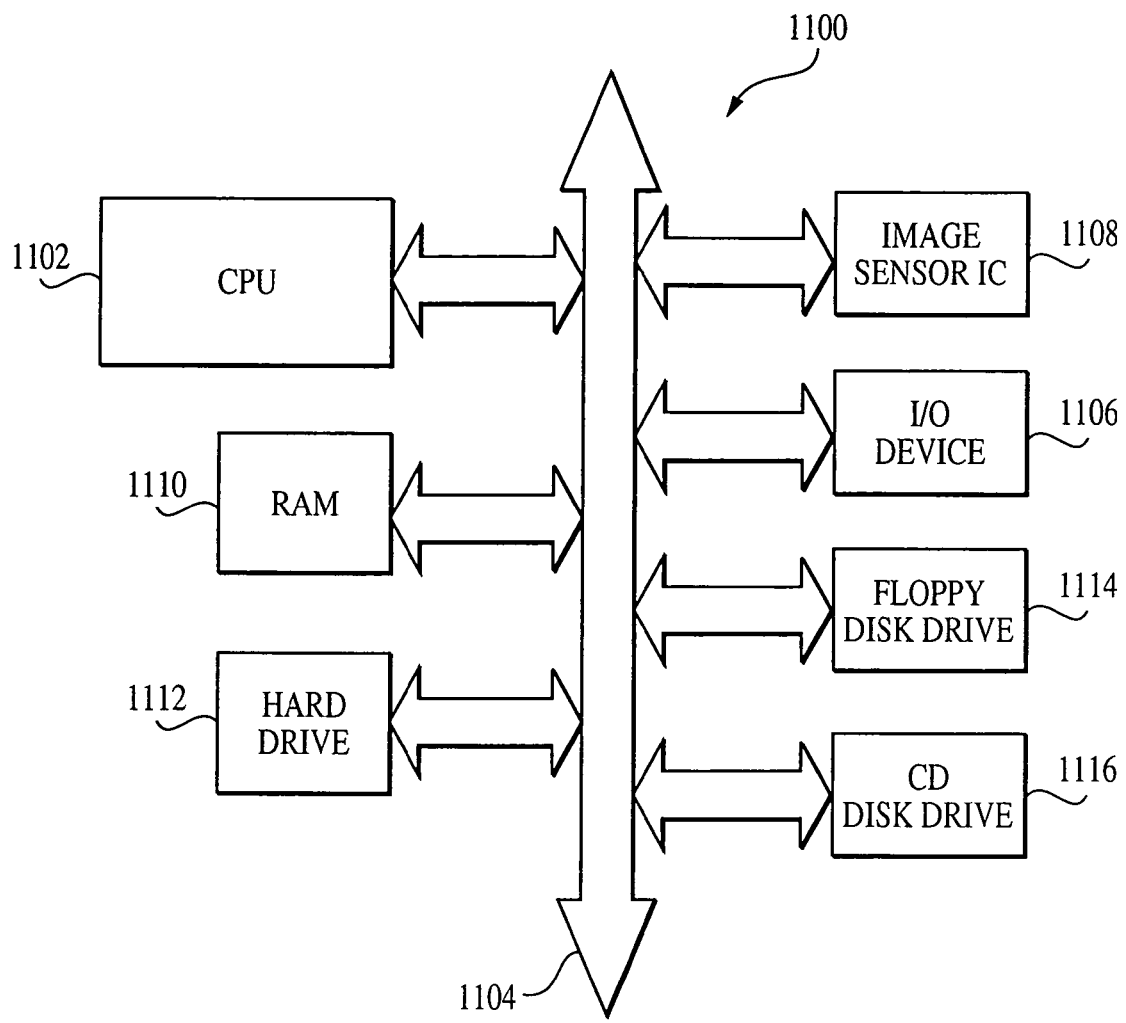
FIG. 11 depicts the FIG. 10 semiconductor chip coupled to a processor system, in accordance with an exemplary embodiment of the invention.

FIG. 11 shows system 1100, a typical processor based system modified to include an image sensor IC as in FIG. 10. Processor based systems exemplify systems of digital circuits that could include an image sensor. Examples of processor based systems include, without limitation, computer systems, camera systems, scanners, machine vision systems, vehicle navigation systems, video telephones, surveillance systems, auto focus systems, star tracker systems, motion detection systems, image stabilization systems, and data compression systems for high-definition television, any of which could utilize the invention.

System 1100 includes central processing unit (CPU) 1102 that communicates with various devices over bus 304. Some of the devices connected to bus 1104 provide communication into and out of system 1100, illustratively including input/output (I/O) device 1106 and image sensor IC 1108. Other devices connected to bus 1104 provide memory, illustratively including random access memory (RAM) 1110, hard drive 1112, and one or more peripheral memory devices such as floppy disk drive 1114 and compact disk (CD) drive 1116.

Image sensor 1108 can be implemented as an integrated image sensor circuit on a chip with dark current reduction circuitry, as illustrated in FIG. 10. Image sensor 1108 may be combined with a processor, such as a CPU, digital signal processor, or microprocessor, in a single integrated circuit.

As described above, it is desirable to develop a pixel configuration with reduced GIDL. Exemplary embodiments of the present invention have been described in which the reset signal RST is generated with a row driver circuit (e.g., 600) and in which the row driver circuit is supplied with a low reset voltage (Vrst_low) as generated by a low reset voltage generator (e.g., 900). The row driver circuit delivers a logic HIGH RST signal of either the power source voltage level (e.g., Vdd) or higher. The row driver circuit also delivers a logic LOW RST signal of Vrst_low (i.e., a voltage level lower than the logic HIGH RST, but higher than a ground voltage level). As a result of raising the logic LOW RST signal from a ground level voltage to another voltage level higher than ground, the difference of potential between the gate of the reset transistor (e.g., 104) and the photodiode (e.g., 106) of the pixel is reduced, thus reducing the level of GIDL.

While the invention has been described in detail in connection with preferred embodiments known at the time, it should be readily understood that the invention is not limited to the disclosed embodiments. Rather, the invention can be modified to incorporate any number of variations, alterations, substitutions or equivalent arrangements not heretofore described, but which are commensurate with the spirit and scope of the invention. For example, although an exemplary embodiment of the invention has been described in connection with specific configurations of n-type and p-type transistors, it should be readily apparent that the invention is not limited to the specific configurations depicted.

In addition, although the semiconductor chip 1000 of FIG. 10 is described in connection with row driver circuit 600 and low reset voltage generator 900, it should be readily apparent that any of the other row driver circuits and generators described herein, or any other row driver circuits known to those of ordinary skill in the art, may be substituted. Further, although exemplary embodiments of the invention are described in connection with photodiodes as the light detecting device, it should be readily apparent that any light detecting device may be used instead without deviating from the spirit or scope of the invention. In addition, it should be noted that although FIGS. 4–6 depict the wells of transistors 404, 504, 508, 604 and 608 as being biased to ground, this is not necessary for practicing the invention and the respective wells may be floated. Accordingly, the invention is not limited by the foregoing description or drawings, but is only limited by the scope of the appended claims.

The invention claimed is:

1. A row driver circuit for use with an active pixel sensor array, the row driver circuit comprising:
    an input stage configured to receive an input signal; and
    an output stage configured to generate an output signal to be forwarded to a reset transistor of said active pixel sensor array based on said received input signal, said output signal varying between two different voltage levels, the lower of said two different voltage levels being greater than a ground level voltage,
    wherein said input and output stages comprise an inverter configured to receive a logic state of said input signal, invert said logic state and supply the inverted logic state at an output terminal of said row driver circuit as said output signal, said inverter comprising:
        a first transistor having a first source/drain terminal coupled to a power supply voltage terminal of said active pixel sensor array; and
        a second transistor having a first source/drain terminal coupled to a second source/drain terminal of said first transistor, and having a second source/drain terminal coupled to a voltage terminal set at said lower of said two different voltage levels, wherein respective gates of said first and second transistors are coupled together for receiving said input signal, and said second source/drain terminal of said first transistor and said first source/drain terminal of said second transistor are coupled together for generating said output signal.

2. The row driver circuit of claim 1, wherein said input signal is a complementary logic state of a reset signal.

3. The row driver circuit of claim 1, wherein said power supply voltage terminal comprises a supply voltage terminal.

4. The row driver circuit of claim 1, wherein said power supply voltage terminal comprises a voltage terminal set to a voltage level higher than said supply voltage.

5. The row driver circuit of claim 3, wherein said supply voltage is Vdd.

6. The row driver circuit of claim 4, wherein said supply voltage is Vdd.

7. A row driver circuit for use with an active pixel sensor array, the row driver circuit comprising:
- an input stage configured to receive an input signal; and
- an output stage configured to generate an output signal to be forwarded to a reset transistor of said active pixel sensor array based on said received input signal, said output signal varying between two different voltage levels, the lower of said two different voltage levels being greater than a ground level voltage,
- wherein said input and output stages further comprise:
  - a first transistor having a first source/drain terminal coupled to a power supply voltage terminal of said active pixel array;
  - a second transistor having a first source/drain terminal coupled to a second source/drain terminal of said first transistor, and having a second source/drain terminal coupled to a voltage terminal set at said lower of the two different voltage levels, wherein said second terminal of said first transistor and said first terminal of said second transistor are coupled together for generating said output signal;
  - a third transistor having a first source/drain terminal coupled to said power supply voltage terminal of said active pixel array, and also having a gate coupled to said second terminal of said first transistor and said first terminal of said second transistor; and
  - a fourth transistor having a first source/drain terminal coupled to a second source/drain terminal of said third transistor and also coupled to a gate of said first transistor, said fourth transistor also having a second source/drain terminal coupled to a ground terminal, wherein
  - a gate of said fourth transistor is configured to receive a true logic state of said input signal, and wherein a gate of said second transistor is configured to receive a complementary logic state of said input signal.

8. The row driver circuit of claim 7, wherein said input signal is a reset signal.

9. A row driver circuit for use with an active pixel sensor array, the row driver circuit comprising:
- an input stage configured to receive an input signal; and
- an output stage configured to generate an output signal to be forwarded to a reset transistor of said active pixel sensor array based on said received input signal, said output signal varying between two different voltage levels, the lower of said two different voltage levels being greater than a ground level voltage,
- wherein said input and output stages comprise:
  - a first transistor having a first source/drain terminal coupled to a power supply voltage terminal of said active pixel array;
  - a second transistor having a first source/drain terminal coupled to a second source/drain terminal of said first transistor, and having a second source/drain terminal coupled to a voltage terminal set at said lower of the two different voltage levels, wherein said second terminal of said first transistor and said first terminal of said second transistor are coupled together for generating said output signal;
  - a third transistor having a first source/drain terminal coupled to said power supply voltage terminal of said active pixel array, and also having a gate coupled to said second terminal of said first transistor and said first terminal of said second transistor; and
  - a fourth transistor having a first source/drain terminal coupled to a second source/drain terminal of said third transistor and also coupled to a gate of said first transistor, said fourth transistor also having a second source/drain terminal coupled to said voltage terminal set at said lower of the two different voltage levels, wherein
  - a gate of said fourth transistor is configured to receive a true logic state of said input signal, and wherein a gate of said second transistor is configured to receive a complementary logic state of said input signal.

10. The row driver circuit of claim 9, wherein said input signal is a reset signal.

11. A low reset voltage generator for use with an active pixel sensor, comprising:
- an input stage for receiving an input voltage level; and
- an output stage for forwarding a low reset voltage level to a row driver circuit of said active pixel sensor depending upon said input voltage level, said low reset voltage level being lower than a power supply voltage level of said active pixel sensor and greater than a ground level voltage,
- wherein said input and output stages comprise:
  - a first transistor having a first source/drain terminal coupled to a power supply voltage terminal of said active pixel sensor; and
  - a second transistor having a first source/drain terminal coupled to a second source/drain terminal of said first transistor, and also having a second source/drain terminal coupled to a ground terminal, a gate of said first transistor being configured to receive said input voltage level and a gate of said second transistor being coupled to said ground terminal.

12. The generator of claim 11, wherein a well of said second transistor is coupled to said output stage.

13. The generator of claim 12, wherein said first and second transistors are p-type metal oxide semiconductor transistors, and wherein said well is an n-well.

14. The generator of claim 11, wherein a well of said second transistor is coupled to said power supply voltage terminal of said active pixel sensor.

15. The generator of claim 14, wherein said first and second transistors are p-type metal oxide semiconductor transistors, and wherein said well is an n-well.

16. A low reset voltage generator for use with an active pixel sensor, comprising:
- an input stage for receiving an input voltage level; and
- an output stage for forwarding a low reset voltage level to a row driver circuit of said active pixel sensor depending upon said input voltage level, said low reset voltage level being lower than a power supply voltage level of said active pixel sensor and greater than a ground level voltage,
- wherein said input and output stages comprise:
  - a first transistor having a first source/drain terminal coupled to a power supply voltage terminal of said active pixel sensor; and
  - a diode having a first terminal coupled to a second source/drain terminal of said first transistor, thus forming said output stage, said diode also having a second terminal coupled to a ground terminal, a gate of said first transistor being configured to receive said input voltage level.

17. A method for resetting a pixel of an active pixel sensor, the method comprising:

receiving at a reset transistor of said pixel a reset signal enabling said pixel to be reset, said reset signal having two different voltage levels, a lower of the two voltage levels being greater than a ground voltage level;

generating said lower voltage level; and receiving said lower voltage level at a row driver circuit and forwarding said lower voltage level to said reset transistor.

18. The method of claim 17, wherein said act of generating comprises:

driving a current through a pair of series connected transistors such that said lower voltage level is generated with respect to ground where said two transistors are coupled together.

19. The method of claim 18, wherein said act of driving comprises:

driving said current through said pair of series connected transistors, wherein a first source/drain terminal of a first transistor is coupled to a power supply voltage terminal of said active pixel sensor, wherein a second source/drain terminal of said first transistor is coupled to a first source/drain terminal of a second transistor, and wherein a second source/drain terminal and a gate of said second transistor are coupled to ground.

20. The method of claim 17, wherein said act of receiving comprises:

receiving said lower voltage level at said row driver circuit and forwarding said lower voltage level to said reset transistor when said pixel is not being reset.

21. A method for operating an active pixel sensor, the method comprising:

generating a low reset voltage level that is lower than a reset voltage of said active pixel sensor and higher than a ground level voltage; and receiving said low reset voltage level at a reset transistor of a pixel after said pixel has been reset, wherein said act of generating comprises driving a current through a transistor coupled in series with a diode, thereby generating said low reset voltage with respect to ground at a point where said transistor and said diode are coupled together.

* * * * *